United States Patent [19]
de Niet et al.

[11] 4,312,073
[45] Jan. 19, 1982

[54] SPECTRUM CONVERTER FOR ANALOG SIGNALS

[75] Inventors: Edmond de Niet; Albert M. A. Rijckaert, both of Eindhoven, Netherlands

[73] Assignee: U.S. Philips Corporation, New York, N.Y.

[21] Appl. No.: 144,792

[22] Filed: Apr. 28, 1980

[30] Foreign Application Priority Data

May 3, 1979 [NL] Netherlands ............. 7903466

[51] Int. Cl.³ .............................. H04L 3/00
[52] U.S. Cl. .............................. 375/19; 375/17; 370/18; 371/56
[58] Field of Search .............. 375/17–20; 340/347 DD, 146.3 Z; 370/18; 371/55, 56

[56] References Cited

U.S. PATENT DOCUMENTS

| | | | |
|---|---|---|---|
| 3,230,310 | 1/1966 | Brogle | 375/17 |
| 3,641,327 | 2/1972 | Nelson, Jr. | 375/17 |
| 3,697,874 | 10/1972 | Kaneko | 375/19 |
| 3,902,117 | 8/1975 | Sheppard | 371/56 |
| 3,938,082 | 2/1976 | Schowe | 371/56 |

*Primary Examiner*—Benedict V. Safourek
*Assistant Examiner*—Stephen Chin
*Attorney, Agent, or Firm*—Thomas A. Briody; William J. Streeter; Laurence A. Wright

[57] ABSTRACT

A device for receiving analog and discrete input signals and for converting the spectrum thereof without loss of information. The resultant signal has a frequency response curve which exhibits zero points at the frequency zero and at half the sample frequency. The second zero point is then suitable for addition of a pilot tone, without the required bandwidth being increased and without interference with the data signal. The device comprises two integrating feedback loops (32, 24/40), the output signals of which are alternately activated. The sign of the active output signal determines the sign of the input signal of the feedback loops and of the output signal of the device. One feedback loop directly receives said output signal, while the other feedback loop receives this output signal via a multiplier which alternately receives a positive and a negative multiplicand.

3 Claims, 4 Drawing Figures

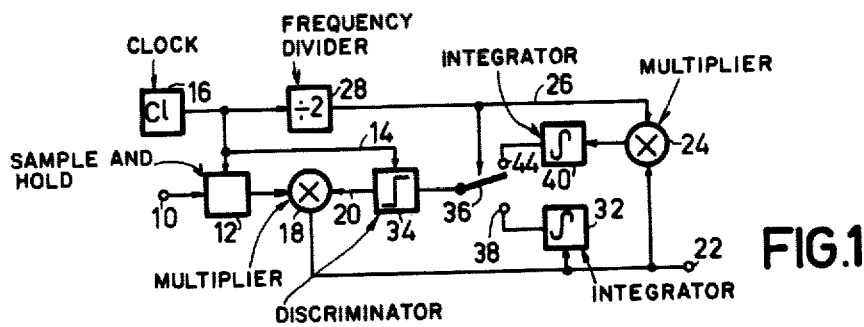
FIG.1
| 12 | 18 | 32 | 26 | 24 | 40 | 20 |
|---|---|---|---|---|---|---|
| 0 | 0 | 0 | +1 | 0 | 0 | +1 |
| 1 | 1 | 0 | -1 | -1 | 0 | +1 |
| 2 | 2 | 1 | +1 | +2 | -1 | +1 |
| 3 | -3 | 3 | -1 | +3 | +1 | -1 |
| 2 | -2 | 0 | +1 | -2 | +4 | -1 |
| 1 | +1 | -2 | -1 | -1 | +2 | +1 |
| 0 | 0 | -1 | +1 | 0 | +1 | -1 |
| 0 | 0 | -1 | -1 | 0 | +1 | +1 |
| A { 3 | -3 | -1 | +1 | -3 | +1 | -1 |
| 0 | 0 | -4 | -1 | 0 | -2 | +1 |
| 3 | +3 | -4 | +1 | +3 | -2 | +1 |
| 0 | 0 | -1 | -1 | 0 | +1 | +1 |
| 3 | -3 | -1 | +1 | -3 | +1 | -1 |
| 0 | 0 | -4 | -1 | 0 | -2 | +1 |
| 0 | 0 | -4 | +1 | 0 | -2 | +1 |
| 0 | 0 | -4 | -1 | 0 | -2 | +1 |
| B { 3 | +3 | -4 | +1 | 3 | -2 | +1 |
| 3 | +3 | -1 | -1 | -3 | +1 | +1 |
| 3 | +3 | +3 | +2 | +1 | +3 | -2 | +1 |
| 3 | -3 | +5 | -1 | +3 | +1 | -1 |
| 3 | -3 | +2 | +1 | -3 | +4 | -1 |
| 3 | +3 | -1 | -1 | -3 | +1 | +1 |
| 3 | +3 | +2 | +1 | +3 | -2 | +1 |
| 3 | -3 | +5 | -1 | +3 | +1 | -1 |
FIG.2
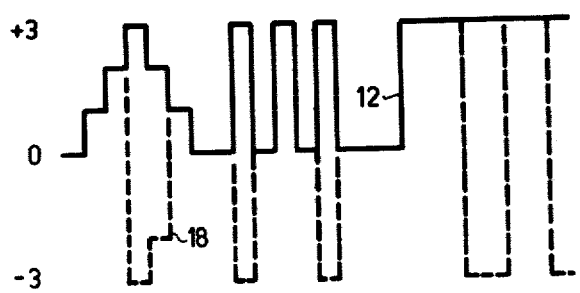
FIG.3

SPECTRUM CONVERTER FOR ANALOG SIGNALS

The invention relates to a device for receiving a first stream of multivalent signals having a single arithmetic sign and for converting these signals into a bipolar second stream of at least quasi-analog output signals, the frequency spectrum of said second stream exhibiting zero points at a frequency equal to zero and at least at one standard frequency other than zero, said device comprising a first series connection of an input for said first stream, a processing circuit for subjecting an instantaneously received signal to an arithmetic operation, and a signal output, a feedback loop from said signal output to a second series connection of a first integrator and a discriminator circuit in order to control said arithmetic operation by way of a bivalent output signal thereof.

BACKGROUND OF THE INVENTION

A device of this kind relating to the invention is known from an article by H. Kaneko and A. Sawai "Feedback balanced code for multilevel PCM transmission", IEEE Trans. on Communication Technology, Vol. COM 17 (No. 5, Oct. 1969), pages 554–563. Reference is notably made to the FIGS. 1 and FIG. 3 of this article. Quasi-analog signals are to be understood to mean herein signals having an enumerable finite range of a number of values which is at least equal to three. The value range of true analog signals is not enumerable. Of course, the maximum amplitude is limited in both cases. The known device each time receives a two-bit code. Every different two-bit code activates at least one own signal generator for generating a signal value. One or more two-bit codes can each time activate one of two different signal generators which supply mutually opposed values. The output signals of the signal generators are applied, via an adding element, to an output of the device. The output signal is further integrated and the integration result is discriminated. The discrimination result (plus or minus) each time activates one of said two different signal generators. The known device is supplied with binary signals which are artificially converted into multivalent signals. Because of the zero point in the frequency response curve at the frequency zero, the known device produces signals which are insensitive to shifting of the zero level. The frequency response curve of the output signals furthermore comprises a zero point at the value of the sample frequency (and also at multiples thereof). At these values, therefore, no data-determined energy is present, so that a synchronizing pilot tone can be added to the signal at these points without the risk of interference. According to the known technique, the lowest feasible frequency for the pilot tone is comparatively high, which is a drawback because the required bandwidth is then greater. Furthermore, the known device becomes more complex as the number of value levels of the input signal increases, because exclusively digital elements are used.

SUMMARY OF THE INVENTION

It is an object of the invention to maintain the useful properties of the known device in cases where analog or quasi-analog signals are received on the input of the device, without necessitating a complex analog/digital converter which introduces additional errors, while, moreover, the lowest zero point in the frequency response curve occurs at a lower value, so that the bandwidth required for the resultant signal-including-pilot-tone is limited. The objects in accordance with the invention are achieved in that the device is adapted to receive at least quasi-analog signals on said input, for which purpose there is provided a synchronization device for generating a synchronization signal having a first frequency, a second feedback loop from said signal output to a second integrator which is activated as a non-inverting integrator by a first control signal and as an inverting integrator by a second control signal in order to apply the integration signal to said discriminator circuit, an output of the synchronization device being connected to a divider for alternately generating said first and second control signal, the connection between the second integrator and the discriminator circuit being active under the control of said first control signal, the connection between the first integrator and the discriminator circuit being active under the control of said second control signal, said arithmetic operation being a multiplication where the sign of the multiplication factor is the same as the sign of the output signal of the discriminator circuit.

Except for the divider and the alternating activation of said first and second feedback loops, all elements of the circuit may in principle be of a continuously operating type. Moreover, the first zero point in the frequency response curve is situated at half the clock pulse frequency. The upper limits of the bandwidth required may then be situated at said clock pulse frequency, because the information is adequately represented in the interval between the frequencies zero and half the sampling frequency. An additional advantage consists in that simple, fullwave rectification of the output signal suffices for the recovery of the originally received signal.

Preferably, there is provided an input sampling device for sampling, under the control of a synchronization signal having said first frequency, the input signal before it is applied to said first series connection. The susceptibility to interference is thus also decreased and, moreover, the operation of the further elements of the circuit is then often more accurate.

Preferably, said device comprises an output which is connected to the output of one of said first and second integrators. In many cases the output signal will be used in combination with a differentiating device, for example, a magnetic tape, where the read head has a differentiating effect. It is then advantageous to derive an output signal from one of the integrators for correction of said differentiating effect.

BRIEF DESCRIPTION OF THE DRAWINGS

The invention will be described in detail hereinafter by way of example, with reference to the accompanying diagrammatic drawings, wherein:

FIG. 1 shows a block diagram of a device in accordance with the invention;

FIG. 2 shows, by way of example, a table with signals occurring in the device shown in FIG. 1;

FIG. 3 shows time diagrams relating to FIG. 2; and

DETAILED DESCRIPTION OF A PREFERRED EMBODIMENT

Figure 4:
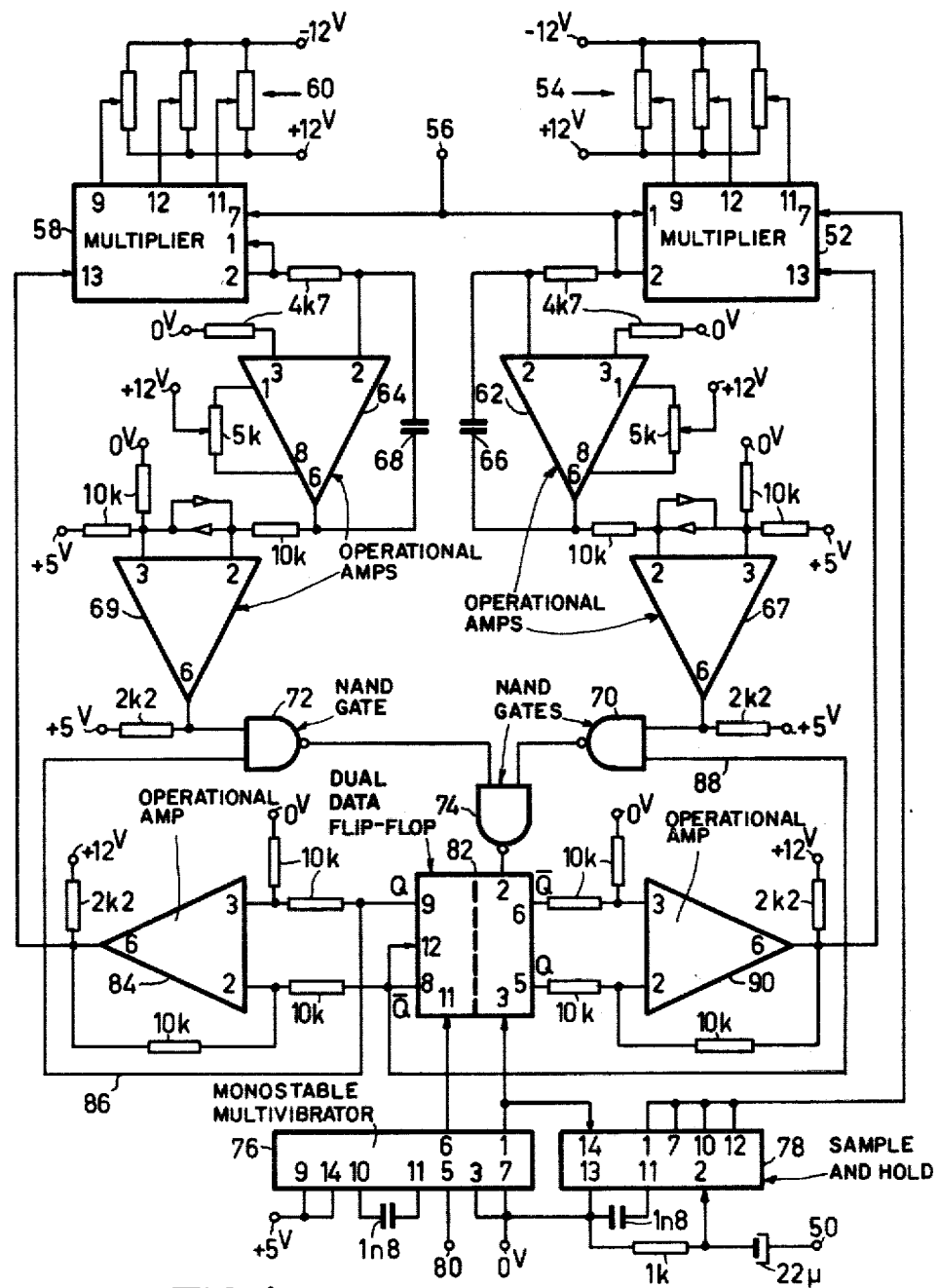
FIG. 4 shows a detailed diagram of a preferred embodiment as shown in FIG. 1.

FIG. 1 shows a block diagram of a device in accordance with the invention. A positive analog signal which originates, for example, from a video camera appears on an input 10. The signal may also be quasi-analog, for example, because it is quantized according to 32 successive grey levels. Element 12 is a sample-and-hold circuit for storing the value of the input signal each time for one clock pulse period. To this end, the clock 16 regularly despatches clock pulses on line 14. Element 18 is a multiplier, in this case by a factor ±1 which is supplied on line 20. The factor may have another value ±a, so that the element 18 operates as an amplifier ($|a|>1$) or as an attenuator ($|a|<1$), depending on the absolute value of a. The output signal of the multiplier is applied to output terminal 22 for further use, for example, for transmission via a wire connection. The output signal on the terminal 22 is applied to an integrator 32 having a sufficiently long integration time. The signal on the terminal 22 is also applied to a second multiplier 24. The sign of the multiplication (by ±1) is determined by the signal on line 26. The signal on the line 26 is determined by the position of a divide by two element 28 which supplies a signal +1 in the one position and a value −1 in the other position. The element 28 is switched over once per clock pulse period by means of a clock signal on the line 14. The fundamental period of the element 28 thus amounts to two clock pulse periods of the clock 16. The output signal of the multiplier 24 is applied to an integrator 40 having a sufficiently long integration time. Thus, the elements 24 and 40 together form an integrator whose integration direction can be switched over. The output signals of the integrators 32, 40 are applied to the inputs 38, 44 respectively, of a selector switch 36. The position of the selector switch 36 is given by the position of the divider element 28. If this divider element supplies a signal +1, the switch 36 is in its upper position; if the relevant signal is −1, the switch is in its lower position. The sign of this position thus corresponds to the integration direction of the switchable integrator. The output of the selector switch 36 is connected to an input of the discriminator 34 which receives activating clock pulses on the line 14. If this discriminator receives a positive signal at the instant at which a clock pulse is received, it subsequently supplies a signal −1 for the time being. If this discriminator receives a negative signal at the instant at which a clock pulse is received, it subsequently supplies a signal +1 for the time being. Thus, the output signal can change only when a clock pulse is received. The output signal of the discriminator 34 controls the multiplier 18.

In the circuit described above, the output signal on the terminal 22 is derived from the multiplier 18. The output signal of the multiplier 24 may alternatively be used. In given cases it may be advantageous to derive this output signal from one of the integrators 32 or 40, i.e. if a differentiating transmission channel is connected therebehind (for example, a read head of a magnetic tape device). Furthermore, the circuit may be modified at various points without its operation being modified. The sample and hold circuit 12 may be connected to the secondary side of the multiplier 18 for supplying the output terminal 22 and the elements 24 and 32 with input signals. Furthermore, the discriminator circuit 34 may be realized in the form of two discriminators, i.e. one between the integrator 32 and the terminal 38, and one between the integrator circuit 40 and the terminal 44 (in which case it is not connected between the switch 36 and the element 18). Furthermore, in given cases the sample and hold circuit 12 may be completely omitted, even though the accuracy of the signal conversion will then sometimes decrease slightly. The circuit can also be readily made suitable for negative input signals on the terminal 10, i.e. in that the decision in the discriminator circuit 34 is the reverse: if it receives a positive signal at the instant at which a clock pulse is received, it supplies a signal +1 and vice versa.

FIG. 2 shows a table of a number of signals occurring in the device shown in FIG. 1. The first column (12) shows the signals stored in the sample and hold circuit 12 under the control of a clock pulse. For the sake of simplicity it is assumed that the input signals have only the discrete values 0, 1, 2, 3. It is also assumed that the switch 36 is initially in its upper position, indicated by a signal +1 in the fourth column. The multiplier 24 then also receives a signal +1. The data in the fourth column change their sign on successive line 3. Furthermore, the multiplier 18 initially receives a signal +1 if the discriminator circuit 34 receives a 0. This choice is arbitrary. In practice, the choice is determined by tolerances in the components of the circuit. The second column shows the output signals of the multiplier 18. The third column shows the output signal of the integrator 32. The sixth column shows the signal from the integrator circuit 40. The seventh column shows the output signal of the discriminator circuit 34 in that, using the switch 36, the output signal of one of the two integrator circuits 32 (third column) and 40 (sixth column) is selected, so that a control signal is formed for the multiplier 18. When this signal is known, the output signals of the multipliers 18 (second column) and 24 (fifth column) are also known therefrom. It is to be noted that the integrators can generally supply continuously varying signals. The values as stated in the table are then applicable at the instants just before an activating clock pulse (edge) is received.

In the embodiment shown here, the input signal successively contains three patterns, it being assumed that at the beginning the positions of the integrators are all equal zero: first a wide peak, followed by an alternating signal with an important component which has half the frequency of the clock signal, and finally a part having an important component of very low frequency. In this respect, FIG. 3 shows a diagram of an input signal (first column) and an output signal (second column) as a function of the time, said signals being shown one above the other. It appears first of all that the input signal (12) can be recovered from the output signal by fullwave rectification. It also appears that the component having half the clock frequency (at A) is not represented in the output signal. This is also applicable to the component of very low frequency (at B). The output signal clearly contains a component at ¼ of the clock frequency, at A as well as at B. The frequency spectrum of the output signal thus contains zero points at frequency zero and at half the clock frequency. Similarly, the output signal can also be derived from the output of the integrator 40, i.e. by a succession of differentiation and fullwave rectification. The output signal of the element 40 can be used directly for writing on a magnetic tape: a relevant read head usually has an inherent differentiating effect. The differentiated signal again contains a zero point at half the clock frequency (of course also at the frequency zero). Similarly, the output signal of the integrator 32 can be used for writing on a magnetic tape. However, this is slightly disadvantageous, because the amplitude of the signal of the element 32 is higher. On the output of the element 18 the spread is from −3 to +3; on the output of the element 40, the spread is from −2 to +4; on the output of the element 32, the spread is from −4 to +5, so 1½ times larger in this example. Thus, a larger number of different signal levels which have to be stored on the magnetic tape is required. The susceptibility to interference is thus increased. Moreover, the output signal of the element 32 is non-symmetrical to a high degree: as a result, it contains an important component of frequency zero. Depending on the shape of the input signal, the same phenomena can also occur when the output signal of the integrator 40 is used. Similarly, the output signal of element 24 can be used without differentiation. The choice will depend on various factors: in the illustrated case the aim is for a small number of circuit elements between input and output.

FIG. 4 shows an elaborated diagram of a preferred embodiment. Terminal 50 is to be connected to an input signal source. Element 78 is a sample and hold circuit of the type HA-2425, make HARRIS. Connection is realized by means of a coupling capacitor, a resistor and a smaller capacitor, and activation takes place by the control pulse on the terminal 14. The connections 1, 7, 10, 12 are interconnected and constitute the output. Element 52 is an integrated multiplier make Analog Devices, type AD 533, as described in the publication "Product Guide" issued by the manufacturer. The element is connected as a multiplier by means of the numbered pins in the prescribed manner, the power supply pins not being indicated. The reference numeral 54 indicates three variable resistors of 20 kohms which are connected to +12 V and −12 V. Terminals 7 and 13 are the inputs. Terminal 2 (the output) of element 52 is connected again to terminal 1 (as an additional input), see the "Product Guide", 1975, pages 163 and 212. Element 52 thus corresponds to element 18 of FIG. 1 and supplies an output signal for further use on terminal 56. This output signal is also applied to multiplier 58 which is also of the type AD 533. This multiplier also comprises an adjusting network, denoted by the reference numeral 60, and realizes the multiplier 24 of FIG. 1. The output signals of the multipliers 52, 58 are applied to the operational amplifiers 62, 64, respectively, of the type Philips TCA 680. Via two capacitors 66, 68 of 22 kpF and a number of resistors, these amplifiers are connected to the indicated connections as integrators having a sufficiently long integration time. The elements 32 and 40 of FIG. 1 are thus realized.

The output signals of the operational amplifiers 62, 64 are applied, via resistors of 10 kohms, to two further operational amplifiers 67, 69 of the type Philips TCA 520. Using a pair of signal-limiting diodes of the type BAX 13 in anti-phase, these amplifiers are connected to the inputs (the type TCA 680 already includes these inputs) and to a number of resistors. As a result of the high internal gain factor, they form generators for a bivalent output signal having the values 0 V and 5 V. These two elements actually generate a binary input signal for the element 34 in FIG. 1; the synchronization by the clock pulse will be described at a later stage. The output signal of the elements 67, 69 is also applied to logic NAND-gates 70, 72, which form part of a module SN 7400, like the gate 74. In this embodiment, the input terminal 80 receives a clock signal having a frequency of 40 Hz from a clock pulse generator not shown. This clock pulse is applied to a monostable multivibrator 76 of the type 74121. This multivibrator is connected in the prescribed manner so that it supplies a short output pulse, under the control of a positive clock pulse edge, on terminal 6 (positive sign) or terminal 1 (negative sign). The pulse duration is determined by an external capacitance and an internal resistance.

These output pulses first of all drive the left half of the flip flop element 82; that is a module of the type SN 7474 which comprises two data flipflops which are activated by the positive (-going) pulse edges. The data output 8 is fed back to the connection 12 (the data input). The connections 8, 9 are connected to the inputs of the operational amplifier 84 of the type TCA 680 which is fed back in order to supply a binary signal having the values ±1. The latter two elements thus constitute the two-divider 28 of FIG. 1. The output signal of the amplifier 84 is applied to the input of the multiplier 58 in order to realize the line 26 of FIG. 1. This completes the description of the control of the second feedback loop.

Via the lines 86, 88, the signals Q, $\overline{Q}$ of the terminals 8, 9 of the element 82 render each time one of the two NAND-gates 72, 70 conductive in order to apply their signal to terminal 2 of the element 82 via the NAND-gate 74. These gates 70, 72, 74 thus implement the switch 36 of FIG. 1. Furthermore, when the output of the element 82 supplies a "1", the gate 72 can conduct and the terminal 13 of element 58 receives a signal +1.

Furthermore, the inverted output pulses of the monostable multivibrator 76 are applied to the clock input of the right half of the element 82. The operation of this half is identical to that of the left half, but it reacts slightly later due to the inversion of the control pulse. The input information is supplied by the gate 74. The operational amplifier 90 is of the type TCA 680 for supplying a ±1 signal and for controlling the multiplier element 52 either as a non-inverting element or as an inverter. This completes the description of FIG. 4.

What is claimed is:

1. A device for receiving a first stream of multivalent signals having a single arithmetic sign at a first repetition frequency, and for converting these signals into a bipolar second stream of at least quasi-analog output signals, said device comprising:

an input for said stream; a synchronization device for generating said first frequency for therewith enabling successive elements of said first stream;

a processing circuit for receiving said successive elements for subjecting these to a multiplication operation and having a first output;

a first integrator having its input connected to said first output and having a second output;

a forward-reverse integrator having its input connected to said first output and having a third output;

a divider for receiving said first frequency and deriving therefrom a bivalent control signal at a fourth output which is connected to a control input of said forward-reverse integrator for in synchronism with the reception of successive elements of said first stream alternating the direction of integration namely, at a first value as a forward integrator while at a second value as reverse integrators;

an alternating connector having a second control input connected to said fourth output for under control of said first value through-connecting said third output and under control of said second value through-connecting said second output, said connector furthermore having a fifth output;
a discriminator circuit having an input connected to said fifth output and having a sixth output for outputting a bivalent control signal;
wherein said processing circuit has a third control input connected to said sixth output whereby, the sign of the multiplicand is the same as the sign of the output signal of the discriminator circuit; and
wherein the frequency spectrum of said second stream as derived from said processing circuit has a frequency spectrum with zero points both at zero frequency and at half said first frequency.

2. A device as claimed in claim 1, characterized in that there is provided an input sample device (12) for sampling the input signal, under the control of a synchronization signal having said first frequency, before this signal is applied to said processing circuit.

3. A device as claimed in claim 1 or 2, characterized in that said device comprises an output which is connected to the output of one of said first and forward-reverse integrators.

* * * * *